United States Patent
He

(10) Patent No.: US 11,895,749 B2
(45) Date of Patent: Feb. 6, 2024

(54) LIGHT EMITTING DIODE (LED) DRIVE METHOD AND CIRCUIT, AND LED LIGHTING DEVICE

(71) Applicant: Joulwatt Technology Co., Ltd., Hangzhou (CN)

(72) Inventor: Yaohua He, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/955,667

(22) Filed: Sep. 29, 2022

(65) Prior Publication Data

US 2023/0095301 A1    Mar. 30, 2023

(30) Foreign Application Priority Data

Sep. 30, 2021  (CN) .......................... 202111157298.3

(51) Int. Cl.
  *H05B 45/34*  (2020.01)
  *H05B 45/345*  (2020.01)
(52) U.S. Cl.
  CPC .......... *H05B 45/34* (2020.01); *H05B 45/345* (2020.01)
(58) Field of Classification Search
  CPC ........ H05B 45/10; H05B 45/30; H05B 45/34; H05B 45/345; H05B 47/10
  See application file for complete search history.

(56) References Cited

U.S. PATENT DOCUMENTS

2014/0347894 A1* 11/2014 Sutardja ................ H02M 3/335
                                                    363/21.12
2020/0367333 A1* 11/2020 Lewis .................. H02M 7/2176

FOREIGN PATENT DOCUMENTS

CN          106102202 B  *  9/2017  .............. H02M 7/04

* cited by examiner

*Primary Examiner* — Jimmy T Vu
(74) *Attorney, Agent, or Firm* — Bayramoglu Law Offices LLC

(57) ABSTRACT

A light-emitting diode (LED) drive method, an LED drive circuit, and an LED lighting device are provided. The method includes: setting preset values of a maximum on-time parameter and a current limit parameter, where the preset values are in at least two sets; selecting a set of the preset values of the maximum on-time parameter and the current limit parameter after a value of a voltage signal on a direct current (DC) bus is detected; controlling a drive current flowing through an LED load based on a selected maximum on-time parameter and a selected current limit parameter. The maximum on-time parameter and the current limit parameter of the system can be adaptively adjusted according to an input voltage, so that the system can have a preferred dimming schedule and dimming depth while realizing a constant current in a wider input voltage range.

20 Claims, 5 Drawing Sheets

LIGHT EMITTING DIODE (LED) DRIVE METHOD AND CIRCUIT, AND LED LIGHTING DEVICE

CROSS REFERENCE TO THE RELATED APPLICATIONS

This application is based upon and claims priority to Chinese Patent Application No. 202111157298.3, filed on Sep. 30, 2021, the entire contents of which are incorporated herein by reference.

TECHNICAL FIELD

The present invention relates to the technical field of power electronics, particularly a light-emitting diode (LED) drive method, an LED drive circuit, and an LED lighting device.

BACKGROUND

Silicon-controlled dimming is a commonly used dimming method at present. The silicon-controlled dimmer, also known as TRIode AC semiconductor switch (TRIAC), adopts the phase control method to achieve dimming, that is, the TRIAC dimmer is controlled to be turned on in every half of the sine wave cycle of alternating current (AC) to obtain the same turn-on angle (that is, the on-time of the TRIAC dimmer in each half of the sine wave cycle). The magnitude of the turn-on angle of the TRIAC can be changed to realize dimming by adjusting the chopping phase of the TRIAC dimmer.

In TRIAC dimming lighting applications with high power factor (PF) requirements, the system is usually required to be in a constant current state when not being connected to a TRIAC dimmer, and in a dimming state when being connected to the TRIAC dimmer. The conventional realization method uses the limitation of the maximum on-time parameter (denoted as Ton_max in the present invention) of the system. As shown in FIGS. 1 and 2, and the controller 40 controls the turn-on state of the power switching transistor in the power conversion circuit 30 according to the preset maximum on-time parameter Ton_max and current limit parameter (denoted as Ipeakmax in the present invention) to control the output current Io (that is, the drive current driving an LED load) of the system. When the turn-on angle (denoted as θ in the present invention) of the TRIAC is large, the system operates in a closed-loop constant current state (the output current Io of the system corresponds to the preset current limit parameter Ipeakmax under the constant current state). When the turn-on angle θ decreases gradually, the on-time Ton of the power switching transistor gradually increases to the maximum on-time parameter Ton_max; at this time, the system begins to change from the closed-loop constant current working state to an open-loop non-constant current working state. With the further decrease of the turn-on angle θ, the output current of the system decreases to achieve the purpose of dimming.

However, in applications with a wide input voltage range, for example, in the North American market, the typical input voltages are 120V and 277V, and the on-time Ton of the power switching transistors varies significantly when the system is at constant current. As shown in FIG. 2, if the input voltage demand of 120V is considered, the system needs to set a large maximum on-time parameter Ton_max, but at the input voltage of 277V, even if the on-time angle θ of the dimmer is already very small, at this time, the system is still in the constant current state, and the dimming schedule is short (that is, the interval of on-time angle θ corresponding to the output current change is small), which affects the dimming depth. If the input voltage demand of 277V is considered, the system needs to set a small maximum on-time parameter Ton_max, but the system can not achieve the constant current state at the input voltage of 120V. In other words, the prior LED drive circuit can not simultaneously meet the needs of constant current and dimming schedule in a wide input voltage range.

Therefore, it is necessary to provide improved technical solutions to overcome the above technical problems in the prior art.

SUMMARY

In order to solve the above technical problems, the present invention provides an LED drive method, an LED drive circuit, and an LED lighting device; the present invention can adaptively adjust the maximum on-time parameter and the current limit parameter of the system according to an input voltage, so that the system can have preferred dimming schedule and dimming depth while realizing a constant current in a wider input voltage range.

According to the first aspect of the present invention, an LED drive method is provided and includes: setting preset values of a maximum on-time parameter and a current limit parameter. The preset values are in at least two sets;
  selecting a set of the preset values of the maximum on-time parameter and the current limit parameter after a value of a voltage signal on a direct current (DC) bus is obtained;
  controlling a drive current flowing through the LED load based on a selected maximum on-time parameter and a selected current limit parameter.

Optionally, the at least two sets of the preset values include a first maximum on-time parameter and a first current limit parameter, and a second maximum on-time parameter and a second current limit parameter. The first maximum on-time parameter is less than the second maximum on-time parameter, and the first current limit parameter is less than the second current limit parameter.

Optionally, when the voltage signal on the DC bus is in the first voltage interval, the maximum on-time parameter is selected as the first maximum on-time parameter, and the current limit parameter is selected as the first current limit parameter;
  when the voltage signal on the DC bus is in the second voltage interval, the maximum on-time parameter is selected as the second maximum on-time parameter, and the current limit parameter is selected as the second current limit parameter.

Optionally, when the time when the voltage signal on the DC bus in the preset voltage interval is less than a preset time threshold, the voltage signal on the DC bus is in the first voltage interval;
  when the time when the voltage signal on the DC bus in the preset voltage interval is greater than the preset time threshold, the voltage signal on the DC bus is in the second voltage interval.

Optionally, when the voltage signal on the DC bus is greater than the second voltage threshold and less than the first voltage threshold, the voltage signal on the DC bus is within the preset voltage interval.

Optionally, the second maximum on-time parameter is equal to a product of the first maximum on-time parameter and the first proportional coefficient, and the second current limit parameter is equal to a product of the first current limit parameter and the second proportional coefficient.

The first proportional coefficient and the second proportional coefficient are both greater than 1.

Optionally, the LED drive method also includes:

adjusting the first proportional coefficient and the second proportional coefficient according to the difference between the time when the voltage signal on the DC bus in the preset voltage interval and the preset time threshold.

Optionally, the voltage signal on the DC bus is the voltage signal of the input AC power supply rectified by phase-cutting.

According to the second aspect of the present invention, an LED drive circuit is provided and includes: a dimmer configured to cut a phase of the input AC power supply to output a first voltage signal;

a rectifying circuit configured to rectify the first voltage signal to output a second voltage signal to the DC bus;
a controller configured to generate a control signal according to a preset maximum on-time parameter and a preset current limit parameter;
a power conversion circuit configured to control the drive current flowing through the LED load based on the second voltage signal and the control signal; and
a parameter regulating circuit configured to select the preset values of the maximum on-time parameter and the current limit parameter that are input to the controller according to the second voltage signal.

Optionally, the parameter regulating circuit includes at least two sets of preset values of the maximum on-time parameter and the current limit parameter, when the second voltage signal is in the first voltage interval, the maximum on-time parameter is selected as the first maximum on-time parameter, and the current limit parameter is selected as the first current limit parameter;
when the second voltage signal is in the second voltage interval, the maximum on-time parameter is selected as the second maximum on-time parameter, and the current limit parameter is selected as the second current limit parameter, The first maximum on-time parameter is less than the second maximum on-time parameter, and the first current limit parameter is less than the second current limit parameter.

Optionally, when the time when the second voltage signal in the preset voltage interval is less than the preset time threshold, the second voltage signal is in the first voltage interval;

when the time when the second voltage signal in the preset voltage interval is greater than the preset time threshold, the second voltage signal is in the second voltage interval.

Optionally, when the second voltage signal is greater than the second voltage threshold and less than the first voltage threshold, the second voltage signal is within the preset voltage interval.

Optionally, the parameter regulating circuit includes:

a sampling unit configured to sample the second voltage signal and generate a sampling signal;
a comparing unit configured to judge the magnitude relationship between the time when the second voltage signal in the preset voltage interval and the preset time threshold according to the sampling signal, and generate a regulating signal according to a judgment result;
a first regulating unit configured to receive the regulating signal. When the regulating signal is in the first level state, the first maximum on-time parameter and the first current limit parameter are output to the controller; when the regulating signal is in the second level state, the second maximum on-time parameter and the second current limit parameter are output to the controller.

Optionally, the sampling unit includes a first resistor and a second resistor that are connected in series between the DC bus and the reference ground, and the sampling unit generates the sampling signal at the common connection point of the first resistor and the second resistor.

Optionally, when the input AC power supply is front-cut by the dimmer, the comparing unit includes:

a first comparing circuit, where a positive input terminal of the first comparing circuit receives the first reference voltage signal, and an negative input terminal of the first comparing circuit receives the sampling signal;
a second comparing circuit, where a positive input terminal of the second comparing circuit receives the second reference voltage signal, and an negative input terminal of the second comparing circuit receives the sampling signal;
a first RS flip-flop, where a set terminal of the first RS flip-flop is connected to an output terminal of the first comparing circuit, a reset terminal of the first RS flip-flop is connected to an output terminal of the second comparing circuit, and an output terminal of the first RS flip-flop outputs a time signal;
a first time comparing unit, where a first input terminal of the first time comparing unit is connected to the output terminal of the first RS flip-flop, and the second input terminal of the first time comparing unit receives a reference time signal, and the output terminal of the first time comparing unit outputs the regulating signal.

Optionally, when the input AC power supply is post-cut by the dimmer, the comparing unit includes:

a third comparing circuit, where a positive input terminal of the third comparing circuit receives the sampling signal, and an negative input terminal of the third comparing circuit receives the second reference voltage signal;
a fourth comparing circuit, where a positive input terminal of the fourth comparing circuit receives the sampling signal, and an negative input terminal of the fourth comparing circuit receives the first reference voltage signal;
a second RS flip-flop, where the set terminal of the second RS flip-flop is connected to an output terminal of the third comparing circuit, a reset terminal of the second RS flip-flop is connected to an output terminal of the fourth comparing circuit, and an output terminal of the second RS flip-flop outputs the time signal T;
a second time comparing unit, where a first input terminal of the second time comparing unit is connected to the output terminal of the second RS flip-flop, a second input terminal of the second time comparing unit receives the reference time signal, and an output terminal of the second time comparing unit outputs the regulating signal.

Optionally, the first regulating unit includes:

a first selecting unit, where a first input terminal of the first selecting unit receives the first maximum on-time parameter, a second input terminal of the first selecting unit receives the second maximum on-time parameter, a control terminal of the first selecting unit receives the regulating signal, and an output terminal of the first selecting unit is connected to the controller;

a second selecting unit, where a first input terminal of the second selecting unit receives the first current limit parameter, a second input terminal of the second selecting unit receives the second current limit parameter, a control terminal of the second selecting unit receives the regulating signal, and an output terminal of the second selecting unit is connected to the controller.

Optionally, the first regulating unit also includes:

a first multiplicative circuit that is connected between the first input terminal of the first selecting unit and the second input terminal of the first selecting unit and is configured to obtain the second maximum on-time parameter according to the first proportional coefficient and the first maximum on-time parameter;

a second multiplicative circuit that is connected between the first input terminal of the second selecting unit and the second input terminal of the second selecting unit and is configured to obtain the second current limit parameter according to the second proportional coefficient and the first current limit parameter, where the first proportional coefficient and the second proportional coefficient are both greater than 1.

Optionally, the parameter regulating circuit also includes:

a differential amplifier circuit, where a first input terminal of the differential amplifier circuit receives the time signal, a second input terminal of the differential amplifier circuit receives the reference time signal, and an output terminal of the differential amplifier circuit outputs a differential amplified signal;

a second regulating unit configured to adjust the first proportional coefficient and the second proportional coefficient according to the differential amplified signal.

Optionally, the power conversion circuit includes:

a first transistor and a sampling resistor that are connected in series, where the control signal controls the drive current by controlling the working state of the first transistor.

When an on-time of the first transistor reaches the preset maximum on-time parameter, or a current on the sampling resistor reaches the preset current limit parameter, the control signal controls the first transistor to be turned off.

According to the third aspect of the present invention, an LED lighting device is provided and includes: an LED load and the LED drive circuit as described above. The LED drive circuit is configured to drive the LED load.

The advantages of the present invention are as follows: based on the LED drive method, the LED drive circuit and the LED lighting device provided by the present invention, the maximum on-time parameter and the current limit parameter preset in the system are adjusted adaptively according to the input voltage on the DC bus, that is, the second voltage signal, which can achieve the constant current while ensuring the system with a preferred dimming schedule and a preferred dimming depth in a wider input voltage range. Therefore, the present invention ensures the constant current state and the dimming schedule in a wider input voltage range simultaneously.

It should be noted that the above general description and the later detailed description are only exemplary and explanatory and do not limit the present invention.

DETAILED DESCRIPTION OF THE EMBODIMENTS

Figure 1:
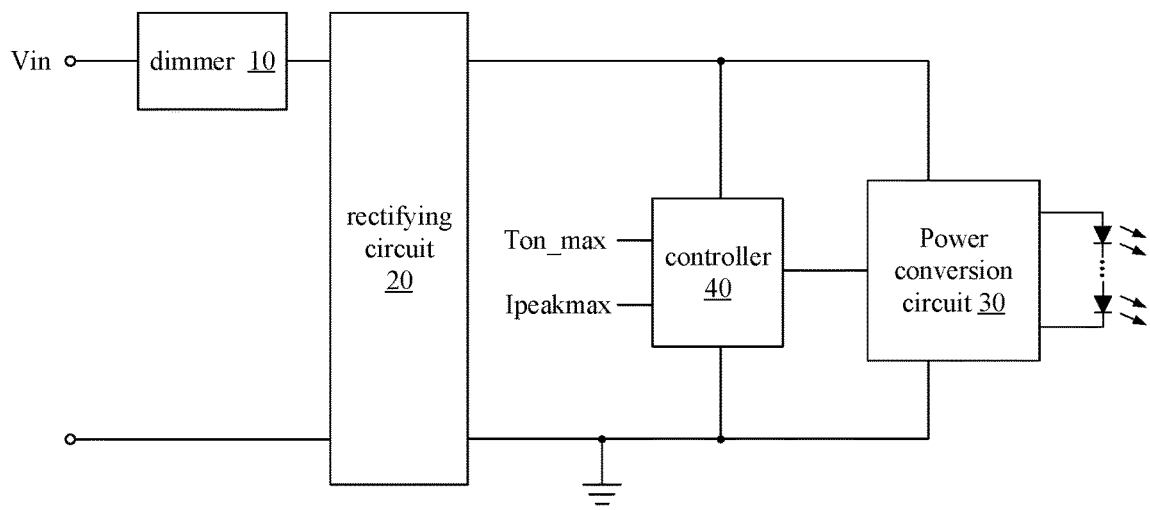
FIG. 1 is a schematic diagram showing a structure of an LED lighting device.
Figure 2:
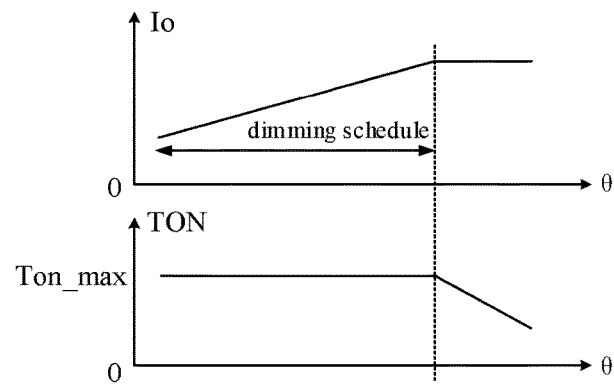
FIG. 2 is a schematic diagram showing a functional relationship between an output current in the LED lighting device and a turn-on angle of a dimmer as well as a functional relationship between an on-time of a power switching transistor in the LED lighting device and the turn-on angle of the dimmer, respectively.

To facilitate the understanding of the present invention, a more comprehensive description of the present invention will be given below with reference to the relevant drawings, preferred embodiments of the present invention are given in the drawings. However, the present invention may be realized in different forms and is not limited to the embodiments described herein. Practically, these embodiments are provided for the purpose of a more thorough and comprehensive understanding on the disclosure of the present invention.

In addition, those skilled in the art should understand that the drawings provided herein are for illustrative purposes and are not necessarily drawn to scale.

Unless expressly stated otherwise, the words "include/including," "contain/containing," and the like words throughout the specification and the claims shall be construed as inclusive and not as exclusive or exhaustive, that is the meaning of "including but not limited to."

In the description of the present invention, it needs to be understood that the terms "first", "second", and the like are used only for descriptive purposes and cannot be understood to indicate or imply relative importance.

Figure 3:
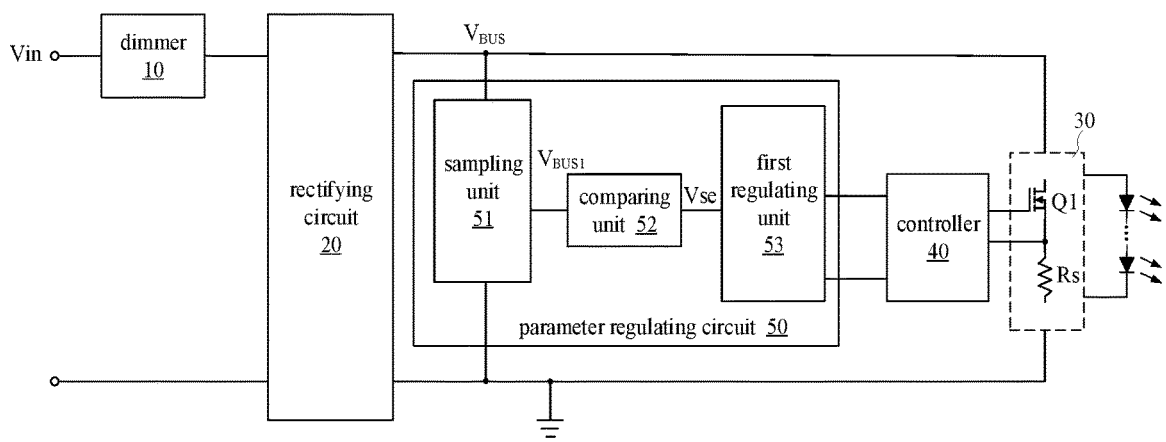
FIG. 3 is a schematic diagram showing a structure of an LED lighting device according to an embodiment of the present invention.

As shown in FIG. 3, an LED lighting device in an embodiment of the present invention includes: an LED drive circuit and an LED load connected to the LED drive circuit, and the LED drive circuit is configured to provide a drive current to the LED load to drive the LED load. The LED drive circuit can control the LED load working in a closed-loop constant current state or open-loop non-constant current state (i.e., dimming state).

The LED load includes at least one LED lamp connected in series and a capacitive load C1 connected in parallel with the at least one LED lamp connected in series. The capacitive load C1 can reduce the impact current of the LED lamp.

The LED drive circuit includes: the dimmer 10, the rectifying circuit 20, the power conversion circuit 30, the controller 40, and the parameter regulating circuit 50.

The dimmer 10 is connected between an AC input terminal and the rectifying circuit 20. The dimmer 10 is configured to cut the phase of an input AC power supply to output a first voltage signal. Optionally, the dimmer 10 may be a front-cut dimmer for front-cutting the phase of the AC power supply, such as a silicon-controlled dimmer of TRIAC, or a post-cut dimmer for post-cutting the phase of the AC power supply, such as a dimmer circuit containing a control switch, and or other conventional circuit structures and devices that can cut the phase of the AC power supply.

The rectifying circuit 20 is configured to convert the AC after wave chopping by the dimmer 10 and rectify the first voltage signal to output a second voltage signal $V_{BUS}$ to a DC bus. Optionally, the rectifying circuit 20 can be a full-bridge rectifying circuit or a half-bridge rectifying circuit.

The power conversion circuit 30 is connected to the LED load and is configured to control the drive current flowing through the LED load based on the second voltage signal $V_{BUS}$ and a control signal generated by the controller 40.

The power conversion circuit 30 includes the first transistor Q1 and the sampling resistor Rs that are connected in series. A control terminal of the first transistor Q1 receives the control signal; the control signal controls the magnitude of the drive current by controlling the working state of the first transistor Q1 (such as the on-time of the first transistor Q1 in a switching cycle). In the present invention, the topological structure of the power conversion circuit 30 is not limited. For example, it can be a linear LED drive circuit, a flyback converter circuit, a Buck circuit, a Boost circuit, a Buck-Boost circuit, and other circuit structures that includes the first transistor Q1 and the sampling resistor Rs. As long as the drive current output to the LED load can be controlled based on the control signal.

The controller 40 is connected to the power conversion circuit 30 to generate the control signal according to the preset maximum on-time parameter Ton_max and the current limit parameter Ipeakmax.

When the on-time of the first transistor Q1 reaches the preset maximum on-time parameter Ton_max, or the current on the sampling resistor Rs reaches the preset current limit parameter Ipeakmax, the controller 40 generates a control signal to control the first transistor Q1 to be turned off.

Further, the controller 40 is usually designed in conjunction with the constant current control solution. By sampling the drive current output to the LED load and comparing the drive current with the preset current limit parameter Ipeakmax, the on-time of the transistor in the power conversion circuit 30 in each switching cycle is controlled, and the drive current flowing through the LED load is regulated to keep constant. In this way, a closed loop constant current state of the LED load is realized. Additionally, in the LED drive circuit connected to the dimmer 10, the maximum on-time Ton_max of the transistor in power conversion circuit 30 in each switching cycle is limited by setting the maximum on-time parameter Ton_max for the controller 40 (when the controller 40 detects that the actual on-time of the transistor in the power conversion circuit 30 in each switching cycle reaches the preset maximum on-time Ton_max, the controller 40 controls to turn off the transistor), Further, under the condition that the on-time of the transistor reaches the preset maximum on-time Ton_max, the open-loop non-constant current state of the LED load is realized by reducing the turn-on angle of the dimmer 10, that is, the brightness of the LED load is adjusted. It is understood that the constant current control solution can be varied in a number of different ways. For example, all LED loads can be constant-current controlled by only one switching device; it is also possible to group LED loads and set a linear device in each group for constant current control. Specific understanding can refer to the prior art and will not be explained here.

The parameter regulating circuit 50 is configured to select the preset values of the maximum on-time parameter Ton_max and the current limit parameter Ipeakmax that are input to the controller 40 according to the second voltage signal $V_{BUS}$. By judging the time when the second voltage signal $V_{BUS}$ on the DC bus is in the preset voltage interval and comparing the time with the preset time threshold, the parameter regulating circuit 50 determines the voltage range of the input voltage on the present DC bus. For example, the voltage value of the input voltage on the present DC bus can be determined as a high voltage or a low voltage. Then, according to the comparison results, the preset values of the maximum on-time parameter Ton_max and the current limit parameter Ipeakmax that are input in the controller 40 can be selected adaptively to ensure both the constant current demand and dimming schedule demand under a wide input voltage range.

In the present embodiment, the parameter regulating circuit 50 includes at least two sets of preset values of the maximum on-time parameter Ton_max and the current limit parameter Ipeakmax. Specifically, if the parameter regulating circuit 50 detects that the time of the second voltage signal $V_{BUS}$ in the preset voltage interval is less than the preset time threshold, then it determines that the second voltage signal $V_{BUS}$ is in the first voltage interval (such as the high voltage interval). In this case, the parameter regulating circuit 50 sets the maximum on-time parameter Ton_max as the first maximum on-time parameter Ton_max1, and sets the current limit parameter Ipeakmax as the first current limit parameter Ipeakmax1; if the parameter regulating circuit 50 detects that the time of the second voltage signal $V_{BUS}$ in the preset voltage interval is greater than the preset time threshold, then it determines that the second voltage signal $V_{BUS}$ is in the second voltage interval (such as the low voltage interval). In this case, the parameter regulating circuit 50 sets the maximum on-time parameter Ton_max as the second maximum on-time parameter Ton_max2, and sets the current limit parameter Ipeakmax as the second current limit parameter Ipeakmax2. The first maximum on-time parameter Ton_max1 is less than the second maximum on-time parameter Ton_max2, that is, Ton_max1<ton_max2, and the first current limit parameter Ipeakmax1 is less than the second current limit parameter Ipeakmax2, that is, Ipeakmax1<Ipeakmax2. In this way, by judging the voltage range of the input voltage on the DC bus, that is, the second voltage signal $V_{BUS}$, different maximum on-time parameters Ton_max and current limit parameters Ipeakmax are configured for the controller 40. The maximum on-time parameter Ton_max and the current limit parameter Ipeakmax preset by the system can adapt to different input voltages in a wide range to ensure that the system has a preferred dimming schedule and dimming depth while achieving constant current in a wider input voltage range, which preferably achieves both constant current and dimming schedule in a wide input voltage range. In addition, the specific values of the first maximum on-time parameter Ton_max1, the second maximum on-time parameter Ton_max2, the first current limit parameter Ipeakmax1, and the second current limit parameter Ipeakmax2 can be reasonably set according to the actual situation and the staff experience on measuring and calculating.

Further, the first voltage threshold and the second voltage threshold are set in the present embodiment, and it is determined whether the second voltage signal $V_{BUS}$ is in a preset voltage interval by comparing the magnitude of the second voltage signal $V_{BUS}$ with the first voltage threshold and comparing the magnitude of the second voltage signal $V_{BUS}$ with the second voltage threshold, respectively. If the second voltage signal $V_{BUS}$ is greater than the second voltage threshold V2 and less than the first voltage threshold V1, it is determined that the second voltage signal $V_{BUS}$ is within the preset voltage interval.

In the present invention, the parameter regulating circuit 50 includes the sampling unit 51, the comparing unit 52, and the first regulating unit 53.

The sampling unit 51 is connected to the DC bus and is configured to sample the second voltage signal $V_{BUS}$ and generate the sampling signal $V_{BUS1}$.

Figure 4:
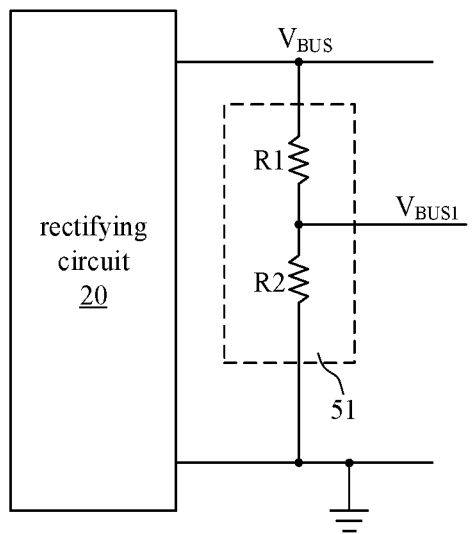
FIG. 4 is a schematic diagram showing a structure of a sampling unit according to the embodiment of the present invention.

For example, as shown in FIG. 4, In the present embodiment, the sampling unit 51 includes the first resistor R1 and the second resistor R2 connected in series between the DC bus and the reference ground. The sampling unit 51 generates the sampling signal $V_{BUS1}$ at the common connection point of the first resistor R1 and the second resistor R2. However, it is understandable that the present invention can also adopt other conventional sampling methods and structures to sample the second voltage signal $V_{BUS}$ on the DC bus, and the present invention is not limited to adopting only the voltage-dividing resistor sampling method shown in FIG. 4.

The comparing unit 52 is configured to judge the magnitude relationship between the time of the second voltage signal $V_{BUS}$ in the preset voltage interval and the preset time threshold according to the sampling signal $V_{BUS1}$ and generate the regulating signal Vse according to the judgment result.

The comparing unit 52 determines the time T of the second voltage signal $V_{BUS}$ in the preset voltage interval by comparing the magnitude of the sampling signal $V_{BUS1}$ with the first reference voltage signal V11 corresponding to the first voltage threshold, and comparing the magnitude of the sampling signal $V_{BUS1}$ with the second reference voltage signal V21 corresponding to the second voltage threshold, then, by comparing the time T with the reference time signal T1 corresponding to the preset time threshold, the voltage range of the input voltage on the DC bus is determined. According to the input voltage range determined, the corresponding regulating signal Vse is generated to adjust the maximum on-time parameter Ton_max and the current limit parameter Ipeakmax of the system. The present invention compares the time of the second voltage signal $V_{BUS}$ in the preset voltage interval with the preset time threshold as the basis for judging the input voltage on the DC bus is the high voltage or low voltage, which can avoid the adverse effect on the judgment result when the output voltage of dimmer may be low at a small angle to improve the judgment accuracy.

It is understandable that when the sampling signal $V_{BUS1}$ is obtained by sampling the second voltage signal $V_{BUS}$ on the DC bus in the way of voltage-dividing sampling, based on the voltage-dividing ratio between the second voltage signal $V_{BUS}$ to the sampling signal $V_{BUS1}$, and the first reference voltage signal V11 and the second reference voltage signal V21 received by the comparing unit 52 are respectively obtained by converting the first voltage threshold and the second voltage threshold based on the corresponding conversion ratio, further, based on the judgment of the magnitude of the sampling signal $V_{BUS1}$, the first reference voltage signal V11, and the second reference voltage signal V21, the magnitude of the second voltage signal $V_{BUS}$, the first voltage threshold V1, and the second voltage threshold V2 are equivalent to judge, further, accurately judging the voltage range where the second voltage signal $V_{BUS}$ is.

Figure 5:
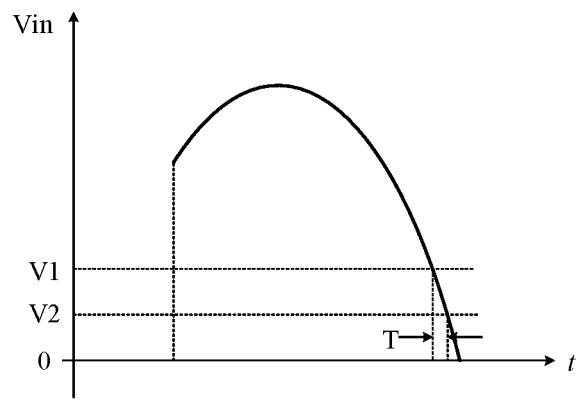
FIG. 5 is a schematic diagram showing a timing waveform of an input voltage in phase front-cut dimming according to an embodiment of the present invention.
Figure 6:
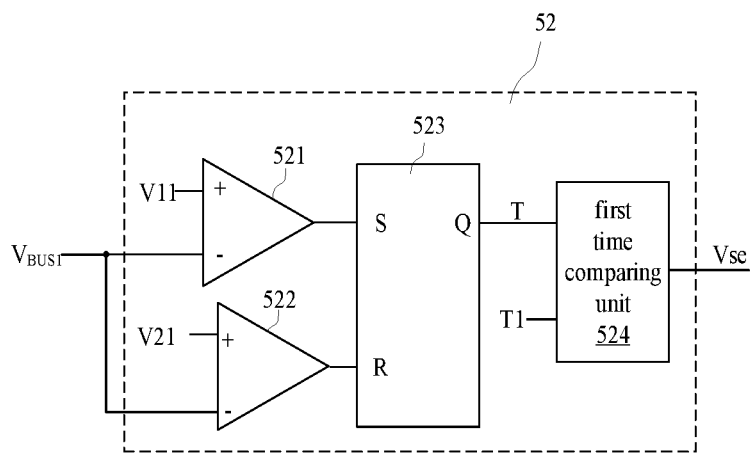
FIG. 6 is a schematic diagram showing a structure of a comparing unit in phase front-cut dimming according to the embodiment of the present invention.

Specifically, in a possible embodiment of the present invention, as shown in FIG. 5, the dimmer 10 is a front-cut dimmer that can achieve a phase front-cut output of the input voltage Vin. In the present embodiment, the comparing unit 52 determines the voltage range where the second voltage signal $V_{BUS}$ is by comparing the time when the input voltage Vin drops from the first voltage threshold V1 to the second voltage threshold V2 during the voltage drop with the preset time threshold. The time of the input voltage (namely, the first voltage signal Vin output by the dimmer 10) in the voltage interval between the first voltage threshold V1 and the second voltage threshold V2 is denoted as T. As shown in FIG. 6, the comparing unit 52 includes: the first comparing circuit 521, the second comparing circuit 522, the first RS flip-flop 523 and the first time comparing unit 524. The positive input terminal of the first comparing circuit 521 receives the first reference voltage signal V11, and the negative input terminal of the first comparing circuit 521 receives the sampling signal $V_{BUS1}$. The positive input terminal of the second comparing circuit 522 receives the second reference voltage signal V21, and the negative input terminal of the second comparing circuit 522 receives the sampling signal $V_{BUS1}$ The set terminal of the first RS flip-flop 523 is connected to the output terminal of the first comparing circuit 521, the reset terminal of the first RS flip-flop 523 is connected to the output terminal of the second comparing circuit 522, and the output terminal of the first RS flip-flop 523 outputs the time signal T. The first input terminal of the first time comparing unit 524 is connected to the output terminal of the first RS flip-flop 523 to receive the time signal T, and the second input terminal of the first time comparing unit 524 receives the reference time signal T1 corresponding to the preset time threshold, and an output terminal of the first time comparing unit 524 outputs the regulating signal Vse based on the comparison results of time signal T and reference time signal T1.

Figure 7:
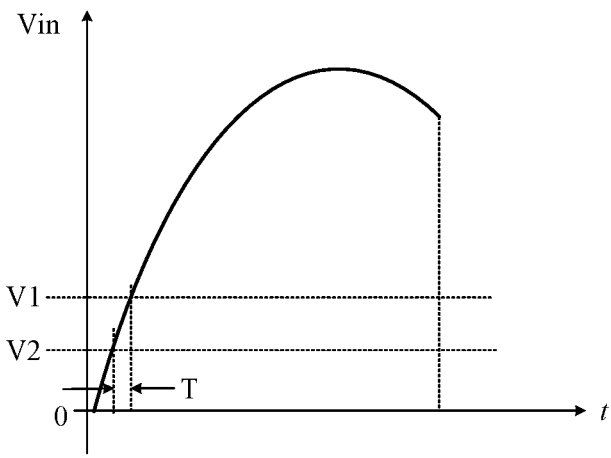
FIG. 7 is a schematic diagram showing a timing waveform of an input voltage in phase post-cut dimming according to an embodiment of the present invention.
Figure 8:
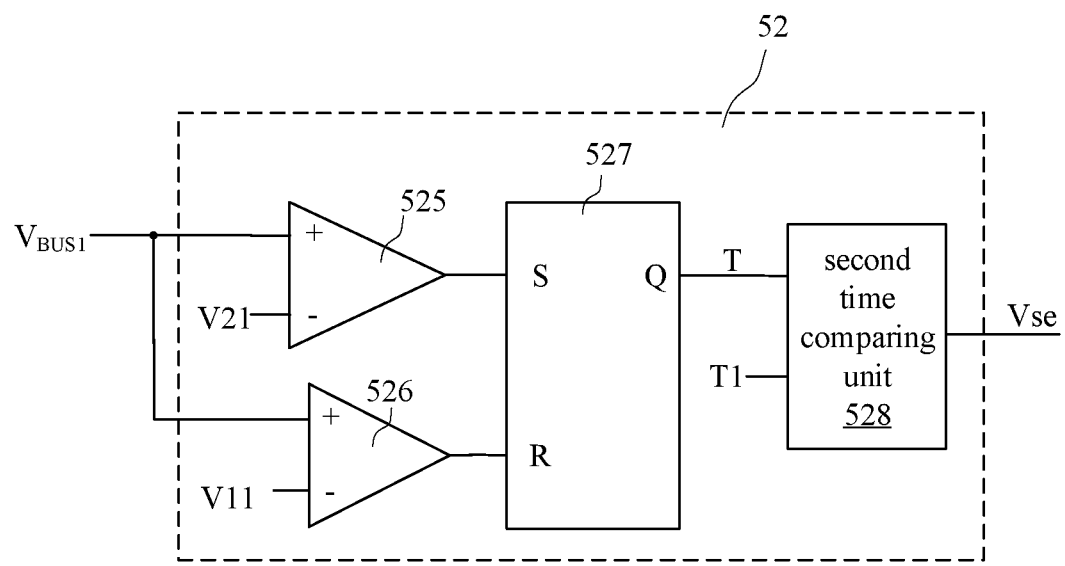
FIG. 8 is a schematic diagram showing a structure of a comparing unit in phase post-cut dimming according to the embodiment of the present invention.

In another possible embodiment of the present invention, as shown in FIG. 7, the dimmer 10 is a post-cut dimmer, which can achieve a phase post-cut output of the input voltage Vin. In the present embodiment, the comparing unit 52 determines the voltage range where the second voltage signal $V_{BUS}$ is by comparing the time when the input voltage Vin rises from the second voltage threshold V2 to the first voltage threshold V1 during the voltage rise with the preset time threshold. The time of the input voltage (namely the first voltage signal Vin output by the dimmer 10) in the voltage interval between the first voltage threshold V1 and the second voltage threshold V2 is denoted as T. As shown in FIG. 8, the comparing unit 52 includes: the third comparing circuit 525, the fourth comparing circuit 526, the second RS flip-flop 527 and the second time comparing unit 528. The positive input terminal of the third comparing circuit 525 receives the sampling signal $V_{BUS1}$, and the negative input terminal of the third comparing circuit 525 receives the second reference voltage signal V21. The positive input terminal of the fourth comparing circuit 526 receives the sampling signal $V_{BUS1}$, and the negative input terminal of the fourth comparing circuit 526 receives the first reference voltage signal V11. The set terminal of the second RS flip-flop 527 is connected to the output terminal of the third comparing circuit 525, the reset terminal of the second RS flip-flop 527 is connected to the output terminal of the fourth comparing circuit 526, and the output terminal of the second RS flip-flop 527 outputs the time signal T. The first input terminal of the second time comparing unit 528 is connected to the output terminal of the second RS flip-flop 527 to receive time signal T, and the second input terminal of the second time comparing unit 528 receives the reference time signal T1 corresponding to the preset time threshold, and an output terminal of the second time comparing unit 528 outputs the regulating signal Vse based on the comparison results between time signal T and reference time signal T1.

The first regulating unit 53 is connected to the comparing unit 52 to receive the regulating signal Vse, and when the regulating signal Vse is in the first level state, the first maximum on-time parameter Ton_max1 and the first current limit parameter Ipeakmax1 are selected and output to the controller 40. When the regulating signal Vse is in the second level state, the second maximum on-time parameter Ton_max2 and the second current limit parameter Ipeakmax2 are selected and output to the controller 40.

Figure 9:
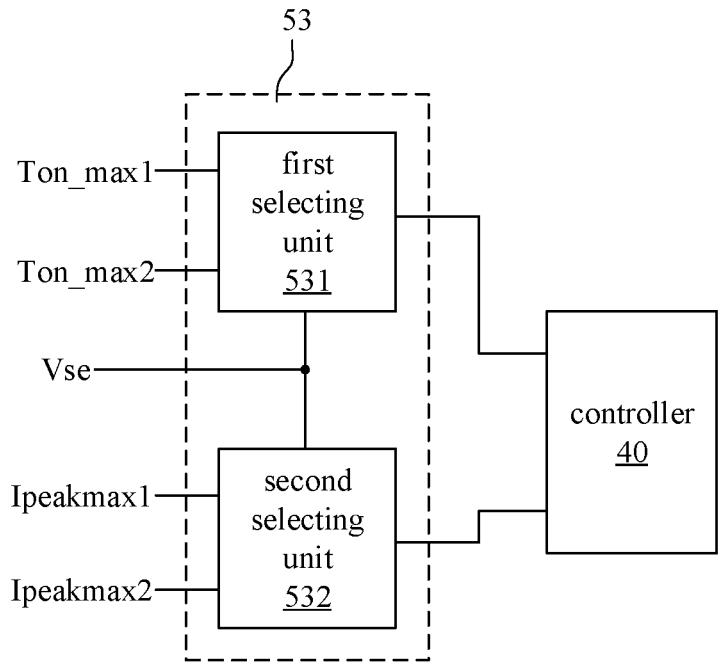
FIG. 9 is a schematic diagram showing a structure of a first regulating unit according to the first embodiment of the present invention.

As shown in FIG. 9, in the disclosed first embodiment, the first regulating unit 53 includes: the first selecting unit 531 and the second selecting unit 532.

The first input terminal of the first selecting unit 531 receives the first maximum on-time parameter Ton_max1, the second input terminal of the first selecting unit 531 receives the second maximum on-time parameter Ton_max2, and the control terminal of the first selecting unit 531 receives the regulating signal Vse output by the comparing unit 52. The output terminal of the first selecting unit 531 is connected to the controller 40 to pass the maximum on-time parameter Ton_max selected by the regulating signal Vse as the preset value to the controller 40, and then the controller 40 controls the turn-on state of the first transistor Q1 based on the maximum on-time parameter Ton_max transferred by the first selecting unit 531.

The first input terminal of the second selecting unit 532 receives the first current limit parameter Ipeakmax1, the second input terminal of the second selecting unit 532 receives the second current limit parameter Ipeakmax2, and the control terminal of the second selecting unit 532 receives the regulating signal Vse output by the comparing unit 52. The output terminal of the second selecting unit 532 is connected to the controller 40 to pass the current limit parameter Ipeakmax selected by the regulating signal Vse as the preset value to the controller 40, and then the controller 40 controls the turn-on state of the first transistor Q1 based on the current limit parameter Ipeakmax transferred by the second selecting unit 532. In the present embodiment, the first maximum on-time parameter Ton_max1 and the second maximum on-time parameter Ton_max2, and the first current limit parameter Ipeakmax1 and the second current limit parameter Ipeakmax2 are independently set by the system, to avoid the mutual interference between the same parameters and reduce the risk of an abnormal output of one parameter affecting another same parameter.

Optionally, for example, the first selecting unit 531 and the second selecting unit 532 are both an either-or selection switch, a one-of-multi selection switch, and other conventional devices or module structures that can realize the either-or output function.

Figure 10:
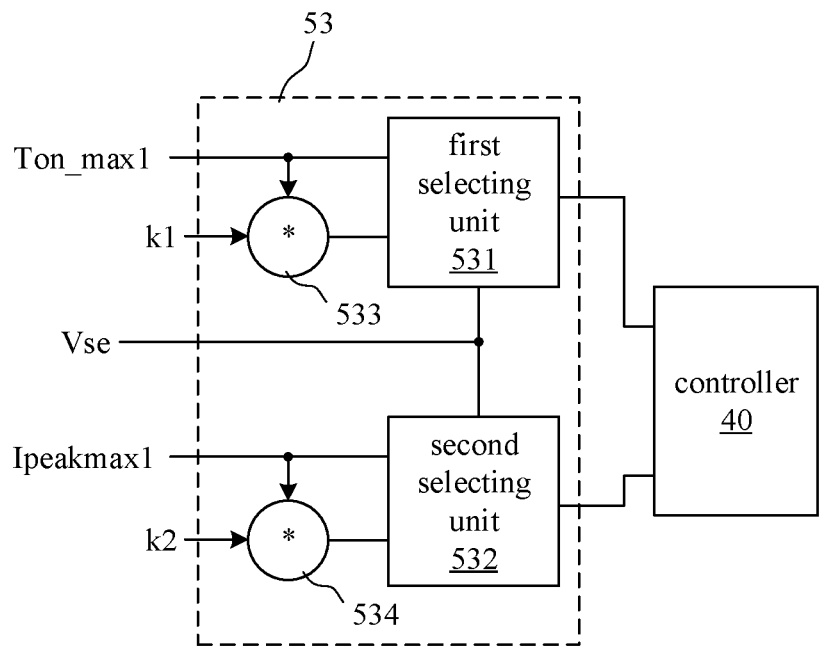
FIG. 10 is a schematic diagram showing a structure of a first regulating unit according to the second embodiment of the present invention.

In the disclosed second embodiment, as shown in FIG. 10, the first regulating unit 53 in the present embodiment also includes the first multiplicative circuit 533 and the second multiplicative circuit 534 compared to the first embodiment shown in FIG. 9.

The first multiplicative circuit 533 is connected between the first input terminal of the first selecting unit 531 and the second input terminal of the first selecting unit 531 and is configured to obtain the second maximum on-time parameter Ton_max2 according to the first proportional coefficient k1 and the first maximum on-time parameter Ton_max1. That is, Ton_max2=Ton_max1*k1, where the first proportional coefficient k1 is a constant greater than 1.

The second multiplicative circuit 534 is connected between the first input terminal of the second selecting unit 532 and the second input terminal of the second selecting unit 532 and is configured to obtain the second current limit parameter Ipeakmax2 according to the second proportional coefficient k2 and the first current limit parameter Ipeakmax1. That is, Ipeakmax2=Ipeakmax1*k2, where the second proportional coefficient k2 is a constant greater than 1. In the present embodiment, the first maximum on-time parameter Ton_max1 and the second maximum on-time parameter Ton_max2 are set in association, and the first current limit parameter Ipeakmax1 and the second current limit parameter Ipeakmax2 are also set in association, In this way, the number of devices or modules needed to implement the solution can be reduced to optimize the system structure and set the design cost. Additionally, it is also beneficial to adjust the parameter values to improve the association degree.

It should be noted that the above solution to realize the association setting between the same parameters based on the multiplicative circuit is only exemplary. For example, the addition circuit and the subtraction circuit can also be configured to realize the association setting between the first maximum on-time parameter Ton_max1 and the second maximum on-time parameter Ton_max2, and the association setting between the first current limit parameter Ipeakmax1 and the second current limit parameter Ipeakmax2. Besides, the first maximum on-time parameter Ton_max1 can be taken as a cardinality to be associated to obtain the second maximum on-time parameter Ton_max2, and the first current limit parameter Ipeakmax1 can be taken as a cardinality to be associated to obtain the second current limit parameter Ipeakmax2; alternatively, the second maximum on-time parameter Ton_max2 can be taken as a cardinality to be associated to obtain the first maximum on-time parameter Ton_max1, and the second current limit parameter Ipeakmax2 can be taken as a cardinality to be associated to obtain the first current limit parameter Ipeakmax1, as long as a result satisfies the magnitude relationship mentioned above, and the present invention does not limit herein.

Figure 11:
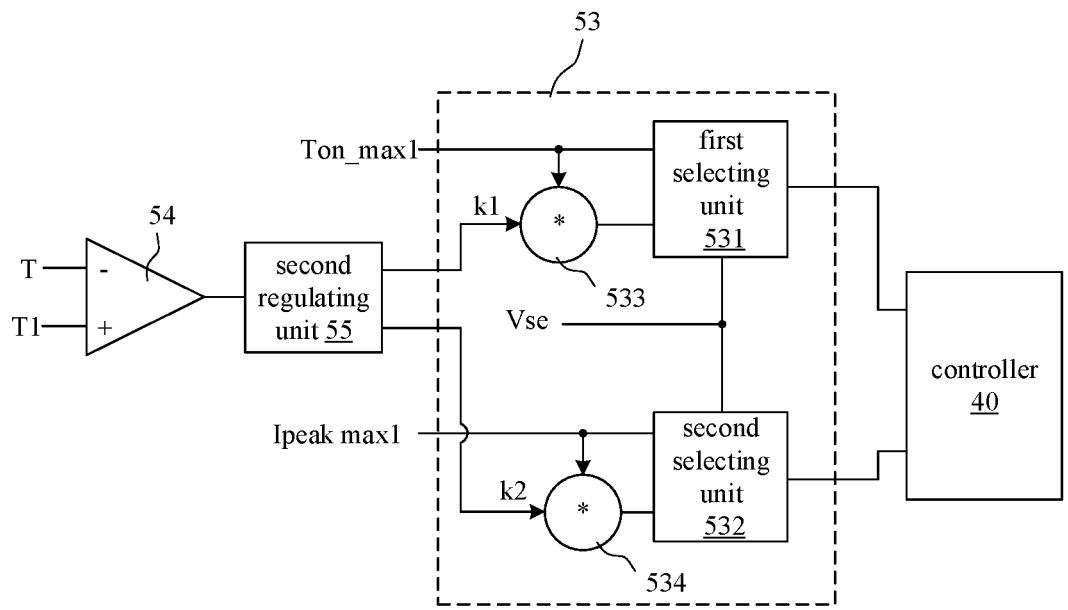
FIG. 11 is a schematic diagram showing a structure of a first regulating unit according to the third embodiment of the present invention.

In the disclosed third embodiment, as shown in FIG. 11, the parameter regulating circuit 50 in the present embodiment also includes: the differential amplifier circuit 54 and the second regulating unit 55 compared to the second embodiment shown in FIG. 10.

The first input terminal of the differential amplifier circuit 54 receives the time signal T, the second input terminal of the differential amplifier circuit 54 receives the reference time signal T1, and the output terminal of the differential amplifier circuit 54 outputs the differential amplified signal. The second regulating unit 55 is connected to the differential amplifier circuit 54 and is configured to adjust the values of the first proportional coefficient k1 and the second proportional coefficient k2 according to the differential amplified signal output from the differential amplifier circuit 54. In the present embodiment, different proportional coefficients are obtained based on the various differences between the time when the input voltage (namely, the second voltage signal $V_{BUS}$) on the DC bus in the preset voltage interval and the preset time threshold. Then, the parameters to be selected (including the second maximum on-time parameter Ton_max2 and the second current limit parameter Ipeakmax2) corresponding to the current input voltage are obtained based on different proportional coefficients. In this way, the adjustment accuracy of the maximum on-time parameter Ton_max and the current limit parameter Ipeakmax can be increased, so that the maximum on-time parameter Ton_max and the current limit parameter Ipeakmax of the system can be adaptively adjusted with the input voltage, which further enhances the effect ensuring constant current and dimming schedule of the system in a wide input voltage range and improves the reliability of the system.

Figure 12:
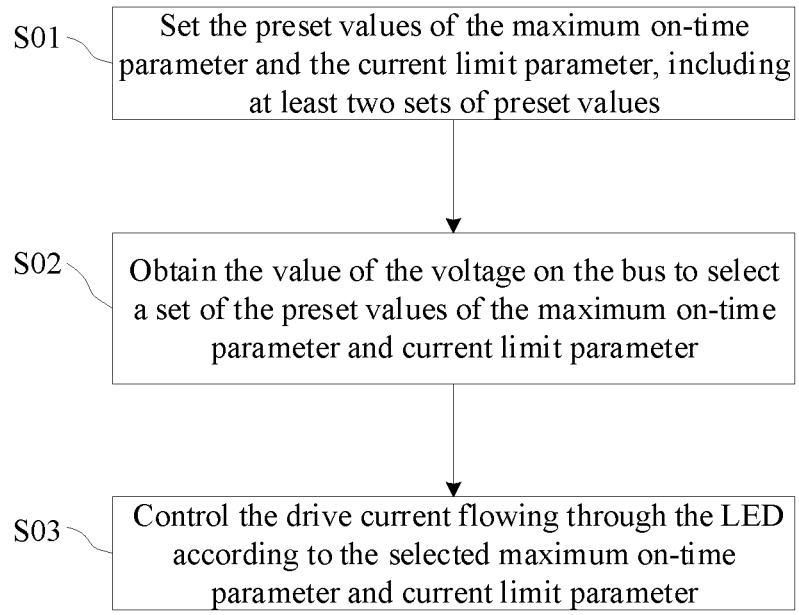
FIG. 12 is a flow diagram showing an LED drive method according to an embodiment of the present invention.

Further, the present invention also provides an LED drive method that can be applied to the LED drive circuit as shown in any one of the FIGS. 3 to 11. As shown in FIG. 12, the method includes and performs the following steps:

In step S01, the preset values of the maximum on-time parameter and the current limit parameter are set, including at least two sets of preset values.

In the present embodiment, the parameter regulating circuit 50 is set in the LED drive circuit, and at least two sets of preset values of the maximum on-time parameter Ton_max and the current limit parameter Ipeakmax are set in the parameter regulating circuit 50. The at least two sets of the preset values of the maximum on-time parameter Ton_max and the current limit parameter Ipeakmax include: the first maximum on-time parameter Ton_max1 and the first current limit parameter Ipeakmax1, and the second maximum on-time parameter Ton_max2 and the second current limit parameter Ipeakmax2, and the first maximum on-time parameter Ton_max1 is less than the second maximum on-time parameter Ton_max2, the first current limit parameter Ipeakmax1 is less than the second current limit parameter Ipeakmax2.

In step S02, the value of the voltage signal on the DC bus is obtained to select a set of preset values of the maximum on-time parameter and the current limit parameter.

In the present embodiment, the voltage signal on the DC bus, namely the second voltage signal $V_{BUS}$, is obtained through the sampling unit. Specific understanding can refer to the above description on the sampling unit 51 specifically, and will not be explained here. The voltage signal on the DC bus is the voltage signal of the input AC power supply rectified by phase-cutting.

Specifically, if the parameter regulating circuit 50 detects that the time when the voltage signal on the DC bus in the preset voltage interval is less than the preset time threshold, it is determined that the voltage signal on the DC bus is in the first voltage interval (such as the high voltage interval). At this time, the parameter regulating circuit 50 sets the first maximum on-time parameter Ton_max1 as the maximum on-time parameter Ton_max, and sets the first current limit parameter Ipeakmax1 as the current limit parameter Ipeakmax; if the parameter regulating circuit 50 detects that the time when the voltage signal on the DC bus in the preset voltage interval is greater than the preset time threshold, it is determined that the voltage signal on the DC bus is in the second voltage interval (such as the low voltage interval). At this time, the parameter regulating circuit 50 sets the second maximum on-time parameter Ton_max2 as the maximum on-time parameter Ton_max, and sets the second current limit parameter Ipeakmax2 as the current limit parameter Ipeakmax. Specific understanding can refer to the above description on the comparing unit 52 and the first regulating unit 53, and will not be explained here.

Optionally, the independent set or the associated set can be performed between the first maximum on-time parameter Ton_max1 and the second maximum on-time parameter Ton_max2, and between the first current limit parameter Ipeakmax1 and the second current limit parameter Ipeakmax2. For example, when the associated set is performed, the second maximum on-time parameter Ton_max2 is equal to the product of the first maximum on-time parameter Ton_max1 and the first proportional coefficient k1, and the second current limit parameter Ipeakmax2 is equal to the product of the first current limit parameter Ipeakmax1 and the second proportional coefficient k2. The first proportional coefficient k1 and the second proportional coefficient k2 are both greater than 1. Specific understanding can refer to the description in FIG. 10, which will not be explained here.

Further, in the case that the first maximum on-time parameter Ton_max1 and the second maximum on-time parameter Ton_max2 are set to be associated, and the first current limit parameter Ipeakmax1 and the second current limit parameter Ipeakmax2 are set to be associated, in order to increase the adjustment accuracy of the maximum on-time parameter Ton_max and the current limit parameter Ipeakmax, the LED drive method also includes that: the first proportional coefficient k1 and the second proportional coefficient k2 are adjusted according to the difference between the time when the voltage signal on the DC bus in the preset voltage interval and the preset time threshold. Specific understanding can refer to the description on FIG. 11, which will not be explained here.

In step S03, the drive current flowing through the LED load is controlled based on the adjusted maximum on-time parameter and current limit parameter.

In the present invention, the implementation solution of step S03 can be understood by referring to the description on the controller 40 and the power conversion circuit 30, which will not be explained here.

In conclusion, in the present invention, the maximum on-time parameter and the current limit parameter preset in the system are adjusted adaptively according to the input voltage on the DC bus, that is, the second voltage signal, which can achieve the constant current while ensuring the system with a preferred dimming schedule and a preferred dimming depth in a wider input voltage range. Therefore, the present invention ensures the constant current state and the dimming schedule in a wider input voltage range simultaneously.

Finally, it should be noted that, it is clear that the above embodiments are only examples for the purpose of clearly stating the present invention and are not a limitation on the mode of embodiments. For those skilled in the art, other variations or changes can be made based on the above descriptions. There is no need and possibility for an exhaustive list of all implementations. The apparent changes or variations resulting from there shall fall within the scope of protection of the present invention.

What is claimed is:

1. A light-emitting diode (LED) drive method, comprising:
   setting preset values of a maximum on-time parameter and a current limit parameter, wherein the preset values are in at least two sets;
   selecting a set of the preset values of the maximum on-time parameter and the current limit parameter after a value of a voltage signal on a direct current (DC) bus is obtained; and
   controlling a drive current flowing through an LED load based on a selected maximum on-time parameter and a selected current limit parameter.

2. The LED drive method according to claim 1, wherein the at least two sets of the preset values comprise a first maximum on-time parameter and a first current limit parameter, and a second maximum on-time parameter and a second current limit parameter, wherein the first maximum on-time parameter is less than the second maximum on-time parameter, and the first current limit parameter is less than the second current limit parameter.

3. The LED drive method according to claim 2, wherein when the voltage signal on the DC bus is in a first voltage interval, the maximum on-time parameter is selected as the first maximum on-time parameter, and the current limit parameter is selected as the first current limit parameter; and
   when the voltage signal on the DC bus is in a second voltage interval, the maximum on-time parameter is selected as the second maximum on-time parameter, and the current limit parameter is selected as the second current limit parameter.

4. The LED drive method according to claim 3, wherein when a time when the voltage signal on the DC bus in a preset voltage interval is less than a preset time threshold, the voltage signal on the DC bus is in the first voltage interval; and
   when the time when the voltage signal on the DC bus in the preset voltage interval is greater than the preset time threshold, the voltage signal on the DC bus is in the second voltage interval.

5. The LED drive method according to claim 4, wherein when the voltage signal on the DC bus is greater than a second voltage threshold and less than a first voltage threshold, the voltage signal on the DC bus is within the preset voltage interval.

6. The LED drive method according to claim 4, wherein the second maximum on-time parameter is equal to a product of the first maximum on-time parameter and a first proportional coefficient, and the second current limit parameter is equal to a product of the first current limit parameter and a second proportional coefficient,
   wherein the first proportional coefficient and the second proportional coefficient are greater than 1.

7. The LED drive method according to claim 6, Wherein the LED drive method further comprises the following:
   adjusting the first proportional coefficient and the second proportional coefficient according to a difference between the time when the voltage signal on the DC bus in the preset voltage interval and the preset time threshold.

8. The LED drive method according to claim 1, wherein the voltage signal on the DC bus is a voltage signal obtained from an input alternating current (AC) power supply, wherein the input AC power supply is rectified by phase-cutting.

9. An LED drive circuit, comprising:
   a dimmer, wherein the dimmer is configured to cut a phase of an input AC power supply to output a first voltage signal;
   a rectifying circuit, wherein the rectifying circuit is configured to rectify the first voltage signal to output a second voltage signal to a DC bus;
   a controller, wherein the controller is configured to generate a control signal according to a preset maximum on-time parameter and a preset current limit parameter;
   a power conversion circuit, wherein the power conversion circuit is configured to control a drive current flowing through an LED load based on the second voltage signal and the control signal; and
   a parameter regulating circuit, wherein the parameter regulating circuit is configured to select preset values of the maximum on-time parameter and the current limit parameter according to the second voltage signal, wherein the preset values are input to the controller.

10. The LED drive circuit according to claim 9, wherein the parameter regulating circuit comprises at least two sets of the preset values of the maximum on-time parameter and the current limit parameter,
    when the second voltage signal is in a first voltage interval, the maximum on-time parameter is selected as a first maximum on-time parameter, and the current limit parameter is selected as a first current limit parameter;
    when the second voltage signal is in a second voltage interval, the maximum on-time parameter is selected as a second maximum on-time parameter, and the current limit parameter is selected as a second current limit parameter, and
    wherein the first maximum on-time parameter is less than the second maximum on-time parameter, and the first current limit parameter is less than the second current limit parameter.

11. The LED drive circuit according to claim 10, wherein when a time when the second voltage signal in a preset voltage interval is less than a preset time threshold, the second voltage signal is in the first voltage interval; and
    when the time when the second voltage signal in the preset voltage interval is greater than the preset time threshold, the second voltage signal is in the second voltage interval.

12. The LED drive circuit according to claim 11, wherein when the second voltage signal is greater than a second voltage threshold and less than a first voltage threshold, the second voltage signal is in the preset voltage interval.

13. The LED drive circuit according to claim 11, wherein the parameter regulating circuit comprises:
    a sampling unit, wherein the sampling unit is configured to sample the second voltage signal and generate a sampling signal;
    a comparing unit, wherein the comparing unit is configured to judge a magnitude relationship between the time when the second voltage signal in the preset voltage interval and the preset time threshold according to the sampling signal, and the comparing unit is configured to generate a regulating signal according to a judgment result; and
    a first regulating unit, wherein the first regulating unit is configured to receive the regulating signal, and when the regulating signal is in a first level state, the first maximum on-time parameter and the first current limit parameter are output to the controller; when the regulating signal is in a second level state, the second maximum on-time parameter and the second current limit parameter are output to the controller.

14. The LED drive circuit according to claim 13, wherein when the input AC power supply is front-cut by the dimmer, the comparing unit comprises:
   a first comparing circuit, wherein a positive input terminal of the first comparing circuit receives a first reference voltage signal, and a negative input terminal of the first comparing circuit receives the sampling signal;
   a second comparing circuit, wherein a positive input terminal of the second comparing circuit receives a second reference voltage signal, and a negative input terminal of the second comparing circuit receives the sampling signal;
   a first RS flip-flop, wherein a set terminal of the first RS flip-flop is connected to an output terminal of the first comparing circuit, a reset terminal of the first RS flip-flop is connected to an output terminal of the second comparing circuit, and an output terminal of the first RS flip-flop outputs a time signal; and
   a first time comparing unit, wherein a first input terminal of the first time comparing unit is connected to the output terminal of the first RS flip-flop, a second input terminal of the first time comparing unit receives a reference time signal, and an output terminal of the first time comparing unit outputs the regulating signal.

15. The LED drive circuit according to claim 13, wherein when the input AC power supply is post-cut by the dimmer, the comparing unit comprises:
   a third comparing circuit, wherein a positive input terminal of the third comparing circuit receives the sampling signal and a negative input terminal of the third comparing circuit receives a second reference voltage signal;
   a fourth comparing circuit, wherein a positive input terminal of the fourth comparing circuit receives the sampling signal, and a negative input terminal of the fourth comparing circuit receives a first reference voltage signal;
   a second RS flip-flop, wherein a set terminal of the second RS flip-flop is connected to an output terminal of the third comparing circuit, a reset terminal of the second RS flip-flop is connected to an output terminal of the fourth comparing circuit, and an output terminal of the second RS flip-flop outputs the time signal T; and
   a second time comparing unit, wherein a first input terminal of the second time comparing unit is connected to the output terminal of the second RS flip-flop, a second input terminal of the second time comparing unit receives a reference time signal, and an output terminal of the second time comparing unit outputs the regulating signal.

16. The LED drive circuit according to claim 13, wherein the first regulating unit comprises:
   a first selecting unit, wherein a first input terminal of the first selecting unit receives the first maximum on-time parameter, a second input terminal of the first selecting unit receives the second maximum on-time parameter, a control terminal of the first selecting unit receives the regulating signal, and an output terminal of the first selecting unit is connected to the controller; and
   a second selecting unit, wherein a first input terminal of the second selecting unit receives the first current limit parameter, a second input terminal of the second selecting unit receives the second current limit parameter, a control terminal of the second selecting unit receives the regulating signal, and an output terminal of the second selecting unit is connected to the controller.

17. The LED drive circuit according to claim 16, wherein the first regulating unit further comprises:
   a first multiplicative circuit, wherein the first multiplicative circuit is connected between the first input terminal of the first selecting unit and the second input terminal of the first selecting unit, and the first multiplicative circuit is configured to obtain the second maximum on-time parameter according to a first proportional coefficient and the first maximum on-time parameter;
   a second multiplicative circuit, wherein the second multiplicative circuit is connected between the first input terminal of the second selecting unit and the second input terminal of the second selecting unit, and the second multiplicative circuit is configured to obtain the second current limit parameter according to a second proportional coefficient and the first current limit parameter, and
   wherein the first proportional coefficient and the second proportional coefficient are both greater than 1.

18. The LED drive circuit according to claim 17, wherein the parameter regulating circuit further comprises:
   a differential amplifier circuit, wherein a first input terminal of the differential amplifier circuit receives the time signal characterizing the time when the second voltage signal in the preset voltage interval, a second input terminal of the differential amplifier circuit receives the reference time signal characterizing the preset time threshold, and an output terminal of the differential amplifier circuit outputs a differential amplified signal; and
   a second regulating unit, wherein the second regulating unit is configured to adjust the first proportional coefficient and the second proportional coefficient according to the differential amplified signal.

19. The LED drive circuit according to claim 9, wherein the power conversion circuit comprises:
   a first transistor and a sampling resistor, wherein the first transistor and the sampling resistor are connected in series, wherein the control signal controls the drive current by controlling a working state of the first transistor, and
   wherein when an on-time of the first transistor reaches the preset maximum on-time parameter, or a current on the sampling resistor reaches the preset current limit parameter, the control signal controls the first transistor to be turned off.

20. An LED lighting device, comprising:
   an LED load; and
   the LED drive circuit according to claim 9, wherein the LED drive circuit is configured to drive the LED load.

* * * * *